(12) United States Patent
Wu et al.

(10) Patent No.: US 11,025,081 B2
(45) Date of Patent: Jun. 1, 2021

(54) WIRELESS POWER SYSTEM

(71) Applicant: NATIONAL CHIAO TUNG UNIVERSITY, Hsinchu (TW)

(72) Inventors: Chung-Yu Wu, Hsinchu (TW); Sung-Hao Wang, Hsinchu (TW)

(73) Assignee: NATIONAL CHIAO TUNG UNIVERSITY, Hsinchu (TW)

(*) Notice: Subject to any disclaimer, the term of this patent is extended or adjusted under 35 U.S.C. 154(b) by 206 days.

(21) Appl. No.: 16/240,789

(22) Filed: Jan. 6, 2019

(65) Prior Publication Data
US 2019/0356151 A1 Nov. 21, 2019

(30) Foreign Application Priority Data
May 16, 2018 (TW) .................. 107116670

(51) Int. Cl.
*H02J 7/02* (2016.01)
*H02J 7/04* (2006.01)
(Continued)

(52) U.S. Cl.
CPC ............. *H02J 7/025* (2013.01); *H02J 7/00* (2013.01); *H02J 7/045* (2013.01); *H02J 50/05* (2016.02); *H02J 2207/20* (2020.01)

(58) Field of Classification Search
CPC .. H02J 7/025; H02J 7/045; H02J 7/052; H02J 7/02; H02J 7/04; H02J 7/00; H02J 50/05; H02J 2007/0059; H02J 2207/20
(Continued)

(56) References Cited

U.S. PATENT DOCUMENTS

| 4,683,414 A * | 7/1987 | Moore | G05F 3/265 320/135 |
| 5,672,952 A * | 9/1997 | Szepesi | H02J 7/0031 320/164 |

(Continued)

FOREIGN PATENT DOCUMENTS

| CN | 105264736 B | 5/2017 |
| CN | 104659923 B | 9/2017 |

(Continued)

OTHER PUBLICATIONS

C. Y. Wu et al., "A 13.56 MHz 40 mW CMOS high-efficiency inductive link power supply utilizing on-chip delay-compensated voltage doubler rectifier and multiple LDOs for implantable medical devices," IEEE Journal of Solid-State Circuits, vol. 49, No. 11, Nov. 2014.

*Primary Examiner* — Richard Isla
*Assistant Examiner* — Dung V Bui
(74) *Attorney, Agent, or Firm* — CKC & Partners Co., LLC

(57) ABSTRACT

A wireless power system receives an input voltage signal from a first node of a secondary side coil, comprises an active rectifier, a buck converter, and a linear charger comprising a first resistor, a second resistor, a third resistor, a mode switching circuit, a current mirror circuit. The active rectifier rectifies the input voltage signal to generate a rectified voltage signal. The first resistor couples between a first node point and second node point. The second resistor couples between the second node point and ground terminal. The third resistor couples between a third node point and ground terminal. The current mirror circuit outputs a reference current and charge current according to the rectified voltage signal and mode switching signal generated by the mode switching circuit. The buck converter outputs a first (Continued)

output voltage signal or second output voltage signal according to a first node point voltage.

11 Claims, 9 Drawing Sheets

(51) Int. Cl.
*H02J 7/00* (2006.01)
*H02J 50/05* (2016.01)

(58) Field of Classification Search
USPC .......................................................... 320/108
See application file for complete search history.

(56) References Cited

U.S. PATENT DOCUMENTS

| | | | |
|---|---|---|---|
| 6,351,110 B1* | 2/2002 | Pappalardo | H02J 7/00 323/285 |
| 7,940,118 B1* | 5/2011 | Forghani-zadeh | H02M 3/155 327/536 |
| 8,781,596 B2 | 7/2014 | Aghassian et al. | |
| 9,393,433 B2 | 7/2016 | Parramon et al. | |
| 10,530,249 B1* | 1/2020 | Lee | G01R 19/16528 |
| 2006/0139002 A1* | 6/2006 | Zemke | H02J 7/0068 320/128 |
| 2007/0075687 A1* | 4/2007 | Ishii | H02M 3/1582 323/225 |
| 2009/0174474 A1* | 7/2009 | Matsuzuka | H03F 1/0261 330/51 |
| 2010/0134086 A1* | 6/2010 | Theil | G01R 19/0092 323/312 |
| 2013/0049678 A1* | 2/2013 | Li | H02J 7/007192 320/107 |
| 2013/0127548 A1* | 5/2013 | Popplewell | H03F 1/0211 330/297 |
| 2015/0042274 A1* | 2/2015 | Kim | H02M 7/219 320/108 |
| 2015/0071464 A1* | 3/2015 | Du | H03F 3/2171 381/94.5 |
| 2016/0268834 A1* | 9/2016 | Satyamoorthy | H04B 5/0037 |
| 2016/0322834 A1* | 11/2016 | Carpenter, Jr. | H02J 7/00 |
| 2017/0040818 A1* | 2/2017 | Kong | H02J 50/40 |

FOREIGN PATENT DOCUMENTS

| | | |
|---|---|---|
| CN | 206790221 U | 12/2017 |
| CN | 105680574 B | 5/2018 |
| TW | 200411980 A | 7/2004 |
| TW | 201521315 A | 6/2015 |
| TW | 201521317 A | 6/2015 |
| TW | I532241 B | 5/2016 |
| TW | 201707342 A | 2/2017 |
| TW | 201729610 A | 8/2017 |
| TW | 201803250 A | 1/2018 |
| TW | 201810104 A | 3/2018 |

* cited by examiner

WIRELESS POWER SYSTEM

CROSS-REFERENCE TO RELATED APPLICATION

This application claims priority to Taiwan Application Serial Number 107116670, filed May 16, 2018, which is herein incorporated by reference in its entirety.

BACKGROUND

Field of Invention

The present disclosure relates to a power system. More particularly, the present disclosure relates to a wireless power system comprises an active rectifier, a linear charger, and a buck converter.

Description of Related Art

With the reaches regarding to the medical electronic device accumulates, the categories of the implantable medical electronic device becomes more and more, such as the pacemaker and the artificial cochlea. The wireless charging technology makes the implantable medical electronic device no longer needs to be charged through the surgery or invasive charging wire, and thus the quality of life of the patient is significantly improved. However, to increase the charging and discharging efficiency, the rectifier circuit, the charging circuit, and the converter circuit of the implantable medical electronic device need to be integrated into a single chip circuit.

SUMMARY

The disclosure provides a wireless power system. The wireless power system is configured to receive an input voltage signal from a first node of a secondary side coil, charge a battery module according to the input voltage signal, and comprise an active rectifier, a linear charger, and a buck converter. The active rectifier is configured to receive the input voltage signal, and rectify the input voltage signal to generate a rectified voltage signal. The linear charger comprises a first resistor, a second resistor, a third resistor, a mode switching circuit, and a current mirror circuit. The first resistor is coupled between a first node point and a second node point, wherein the battery module coupled with the first node point. The second resistor is coupled between the second node point and a ground terminal. The third resistor is coupled between a third node point and the ground terminal. The mode switching circuit is configured to generate a mode switching signal according to a second node point voltage of the second node point and a third node point voltage of the third node point. The current mirror circuit is configured to output a reference current and a charge current to the third node point and the first node point, respectively, according to the rectified voltage signal and the mode switching signal. The buck converter is coupled with the first node point, and configured to selectively output a first output voltage signal or a second output voltage signal according to a first node point voltage of the first node point.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
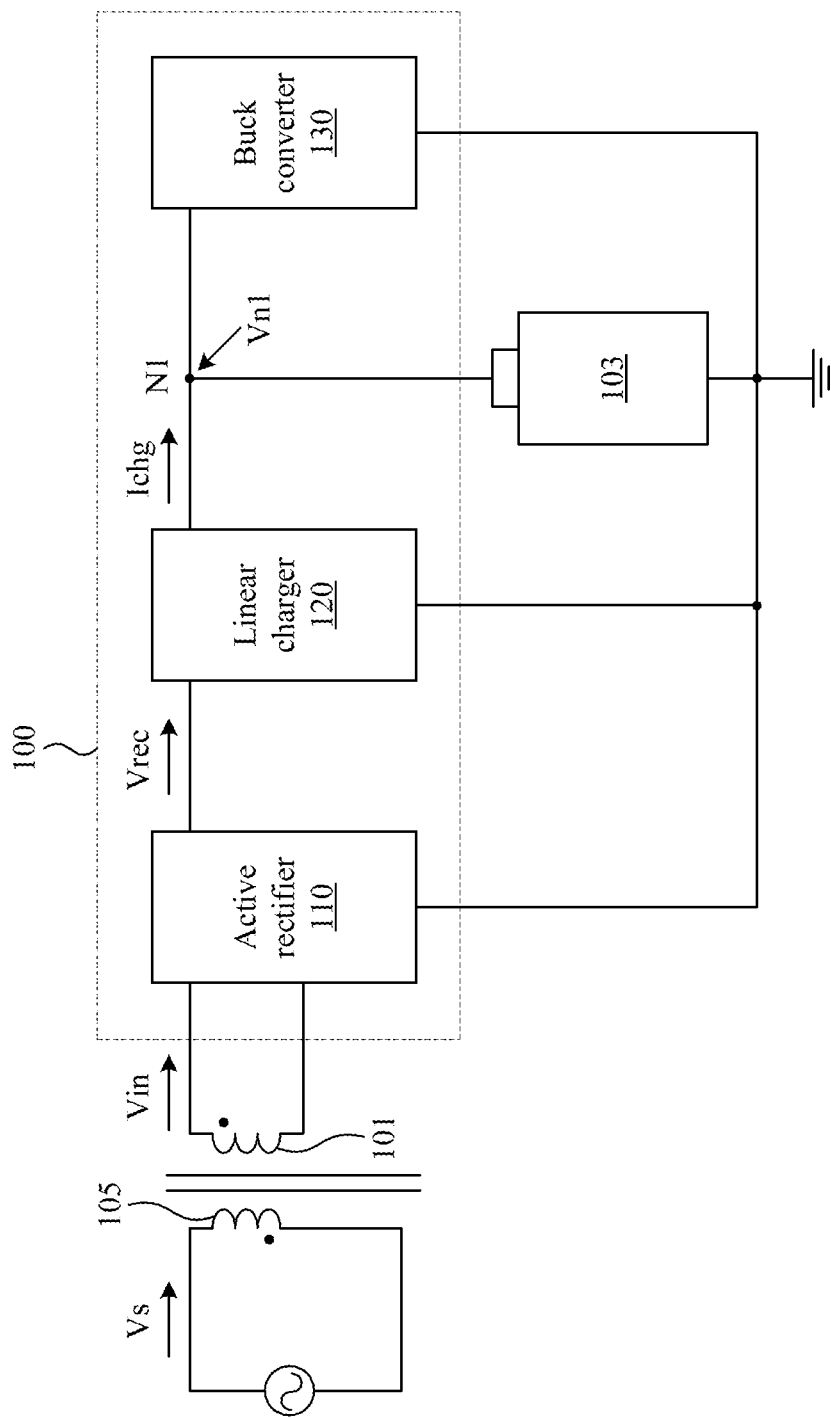
FIG. 1 is a simplified block diagram of a wireless power system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified block diagram of a wireless power system 100 according to one embodiment of the present disclosure. The wireless power system 100 is coupled with a secondary side coil 101 and a battery module 103. When a power voltage signal Vs flows through a first side coil 105, the secondary side coil 101 may provide an input voltage signal Vin. The wireless power system 100 is configured to receive the input voltage signal Vin, and charge the battery module 103 according to the input voltage signal Vin. The wireless power system 100 comprises an active rectifier 110, a linear charger 120, and a buck converter 130. For the sake of brevity, other functional blocks of the wireless power system 100 are not shown in FIG. 1.

In practice, the battery module 103 may be realized by various suitable lithium batteries. The wireless power system 100, the secondary side coil 101, and the battery module 103 is suitable for the implantable medical electronic device, and capable of cooperatively provide power for the implantable medical electronic device.

In addition, the first side coil 105 may be realized by various suitable wireless charging transmitters. When the first side coil 105 is near by the secondary side coil 101, the charging operation for the battery module 103 may be conducted by the cooperation of the first side coil 105, the secondary side coil 101, and the wireless power system 100.

The active rectifier 110 is coupled with the first node and second node of the secondary side coil 101, and configured to receive the input voltage signal Vin from the first node of the secondary side coil 101. The active rectifier 110 is further configured to rectify the input voltage signal Vin to generate a rectified voltage signal Vrec. The linear charger 120 is coupled between the active rectifier 110 and the first node point N1, and configured to receive the rectified voltage signal Vrec. The linear charger 120 is further configured to output a charge current Ichg to the first node point N1 according to the rectified voltage signal Vrec, so as to charge the battery module 103 coupled with the first node point N1. The buck converter 130 is coupled with the first node point N1, and configured to selectively output a first output voltage signal Vout1 or a second output voltage signal Vout2 according to the first node point voltage Vn1 of the first node point N1. The first node point voltage Vn1 may be provided by the linear charger 120 or battery module 103.

Figure 2:
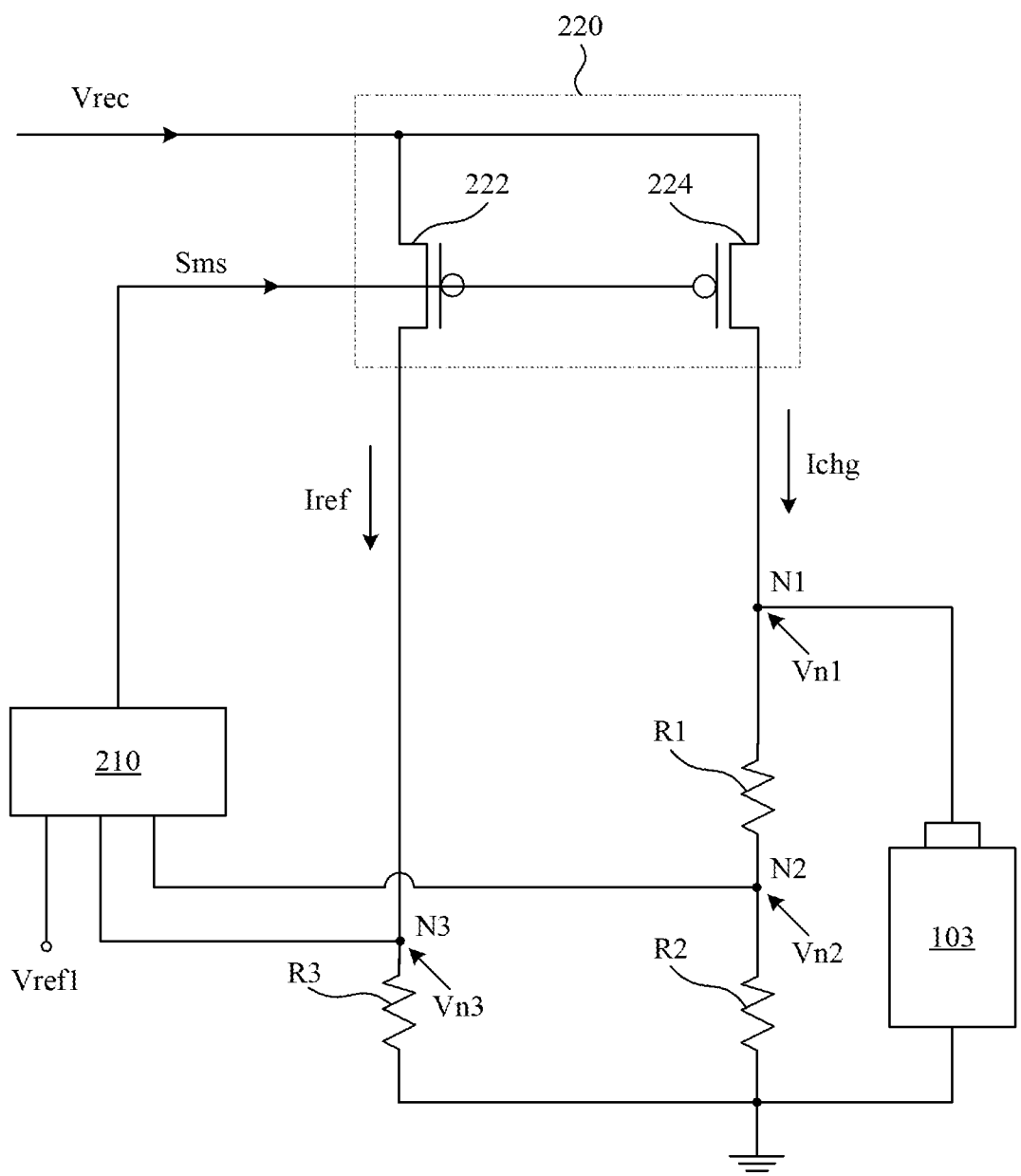
FIG. 2 is a simplified functional block diagram of the linear charger according to one embodiment of the present disclosure.

FIG. 2 is a simplified functional block diagram of the linear charger 120 according to one embodiment of the present disclosure. The linear charger 120 comprises a first resistor R1, a second resistor R2, a third resistor R3, a mode switching circuit 210, and a current mirror circuit 220. The first resistor R1 is coupled between the first node point N1 and the second node point N2, the second resistor R2 is coupled between the second node point N2 and the ground terminal, and the third resistor R3 is coupled between the third node point N3 and the ground terminal. The mode switching circuit 210 is coupled with the second node point N2 and the third node point N3, and is configured to output the mode switching signal Sms according to the second node point voltage Vn2 of the second node point N2 and the third node point voltage Vn3 of the third node point N3. The current mirror circuit 220 is configured to output the reference current Iref and the charge current Ichg to the third node point N3 and the first node point N1, respectively, according to the rectified voltage signal Vrec and the mode switching signal Sms.

In the embodiment of FIG. 2, the current mirror circuit 220 comprises a first transistor 222 and a second transistor 224, wherein the width length ratio of the second transistor 224 is larger than the width length ratio of the first transistor 222. The first node of the first transistor 222 is configured to receive the rectified voltage signal Vrec, and the second node of the first transistor 222 is coupled with the third node point N3. The first node of the second transistor 224 is configured to receive the rectified voltage signal Vrec, and the second node of the second transistor 224 is coupled with the first node point N1. In addition, the control node of the first transistor 222 and the control node of the second transistor 224 are configured to receive the mode switching signal Sms from the mode switching circuit 210.

In practice, the first transistor 222 and the second transistor 224 may be realized by various suitable P-type transistors.

It is worth mentioning that the current mirror circuit 220 may determine to use a constant current or a constant voltage to charge the battery module 103 according to the mode switching signal Sms.

Specifically, the first node point voltage Vn1 and the second node point voltage Vn2 may reflect the state of charge of the battery module 103. For example, when the state of charge of the battery module 103 is closed to 100%, the first node point voltage Vn1 may be 4.2 V and the second node point voltage Vn2 may be 1.2 V. When the second node point voltage Vn2 is smaller than a predetermined voltage, the mode switching circuit 210 may instruct the current mirror circuit 220 to output the reference current Iref and the charge current Ichg, so as to charge the battery module 103 by the charge current Ichg. In this situation, the charge current Ichg has a fixed ratio with the reference current Iref. In some embodiment, the ratio of the reference current Iref to the charge current Ichg may be 1 to 1000.

On the other hand, when the second node point voltage Vn2 is larger than or equal to the predetermined voltage, the mode switching circuit 210 may instruct the current mirror circuit 220 to configure the magnitude of the charge current Ichg to be approximately negatively correlated with the magnitude of the first node point voltage Vn1 or the second node point voltage Vn2, so as to charge the battery module 103 by the constant voltage.

Figure 3:
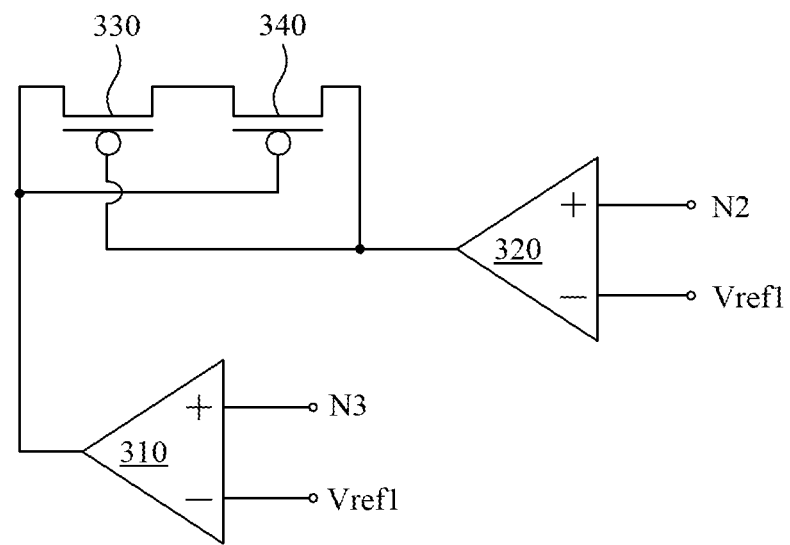
FIG. 3 is a simplified block diagram of the mode switching circuit according to one embodiment of the present disclosure.

FIG. 3 is a simplified block diagram of the mode switching circuit 210 according to one embodiment of the present disclosure. The mode switching circuit 210 comprises a first operational amplifier 310, a second operational amplifier 320, a third transistor 330, and the fourth transistor 340. The first input node of the first operational amplifier 310 (e.g., the positive input node) is coupled with the third node point N3, and the second input node of the first operational amplifier 310 (e.g., the negative input node) is configured to receive the first reference voltage Vref1. The first input node of the second operational amplifier 320 (e.g., the positive input node) is coupled with the second node point N2, and second input node of the second operational amplifier 320 (e.g., the negative input node) is configured to receive the first reference voltage Vref1. The first node of the third transistor 330 is coupled with the output node of the first operational amplifier 310, and the control node of the third transistor 330 is coupled with the output node of the second operational amplifier 320. The first node of the fourth transistor 340 is coupled with the second node of the third transistor 330, the second node of the fourth transistor 340 is coupled with the output node of the second operational amplifier 320, and the control node of the fourth transistor 340 is coupled with the output node of the first operational amplifier 310. For the sake of brevity, other functional blocks of the mode switching circuit 210 are not shown in FIG. 3.

In practice, the third transistor 330 and fourth transistor 340 may be realized by various suitable P-type transistors.

The operations of the linear charger 120 will be further described in the following by reference to FIGS. 2 and 3. When the state of charge of the battery module 103 is at a lower value (e.g., lower than 95%), the first node point voltage Vn1 and the second node point voltage Vn2 would both be lower than the first reference voltage Vref1. Therefore, the first operational amplifier 310 and the second operational amplifier 320 would output low voltages. In addition, the voltage outputted by the first operational amplifier 310 is lower than the voltage outputted by the second operational amplifier 320. As a result, the third transistor 330 may be conducted similarly to a forward biased diode, the fourth transistor 340 may be switched off similarly to a reverse biased diode, and thus the mode switching circuit 210 would select the output of the first operational amplifier 310 as the mode switching signal Sms.

In this situation, the mode switching signal Sms may have a fixed voltage level. Thus, the current mirror circuit 220 may output the reference current Iref having a fixed value, and output the charge current Ichg having a fixed ratio with the reference current Iref, so as to charge the battery module 103 under a constant current mode.

While the state of charge of the battery module 103 increases, the first node point voltage Vn1 and the second node point voltage Vn2 may be increased with the state of charge of the battery module 103. Thus, the voltage outputted by the second operational amplifier 320 may also be increased. When the state of charge of the battery module 103 has a higher value (e.g., larger than 95%), the voltage outputted by the second operational amplifier 320 may be higher than the voltage outputted by the first operational amplifier 310. As a result, the third transistor 330 may be switched off similarly to the reverse biased diode, the fourth transistor 340 may be conducted similarly to a forward biased diode, and thus the mode switching circuit 210 would select the output of the second operational amplifier 320 as the mode switching signal Sms.

In this situation, since the voltage outputted by the second operational amplifier 320 is increased, the second transistor 224 would be gradually switched off, and thus the magnitude of the charge current Ichg would be gradually decreased. The magnitude of the charge current Ichg may be approximately negatively correlated with the magnitude of the first node point voltage Vn1 or the second node point voltage Vn2, so as to charge the battery module 103 under a constant voltage mode.

Figure 4:
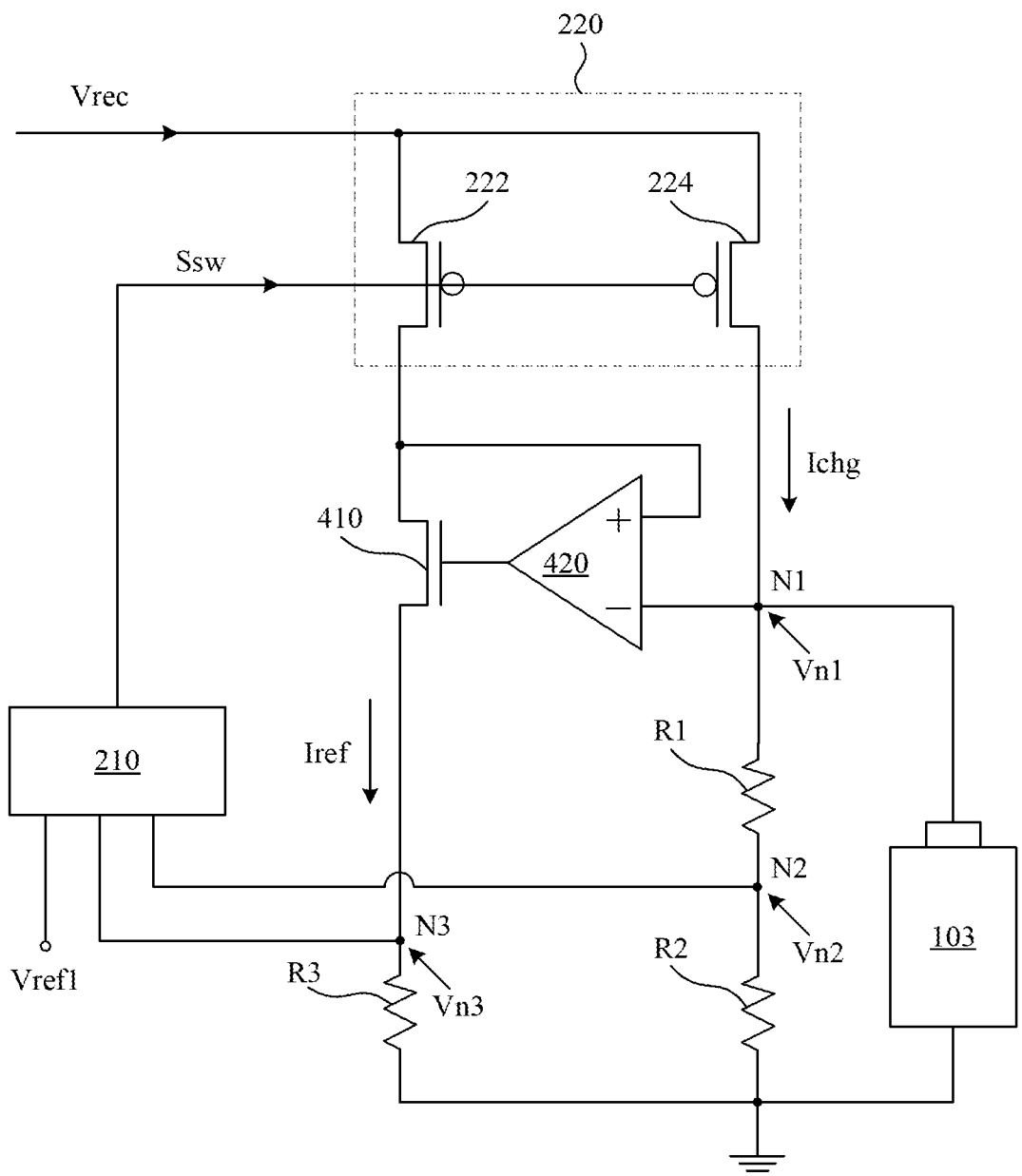
FIG. 4 is a simplified functional block diagram of a linear charger according to one embodiment of the present disclosure.

FIG. 4 is a simplified functional block diagram of a linear charger 120a according to one embodiment of the present disclosure. The linear charger 120a is suitable for the wireless power system 100 and is similar to the linear charger 120, and the difference is that the linear charger 120a further comprises a regulating transistor 410 and a regulating operational amplifier 420. The first node of the regulating transistor 410 is coupled with the second node of the first transistor 222, and the second node of the regulating transistor 410 is coupled with the third node point N3. The first input node of the regulating operational amplifier 420 (e.g., the positive input node) is coupled with the first node of the regulating transistor 410, the second input node of the regulating operational amplifier 420 (e.g., the negative input node) is coupled with the first node point N1, and the output node of the regulating operational amplifier 420 is coupled with the control node of the regulating transistor 410.

When the linear charger 120a charges the battery module 103 under the constant current mode, the regulating transistor 410 and the regulating operational amplifier 420 may dynamically regulate the magnitude of the charge current Ichg. When the magnitude of the charge current Ichg is increased, for example, the voltage outputted by the regulating operational amplifier 420 may be decreased, and thereby making the regulating transistor 410 be gradually switched off. Therefore, the magnitude of the reference current Iref may be gradually decreased, and the magnitude of the charge current Ichg having the fixed ratio with the reference current Iref may also be decreased. As another example, when the magnitude of the charge current Ichg is decreased, the voltage outputted by the regulating operational amplifier 420 may be increased, and thereby making the regulating transistor 410 be gradually conducted to increase the magnitude of the charge current Ichg.

The foregoing descriptions regarding the implementations, connections, operations, and related advantages of the linear charger 120 are also applicable to the linear charger 120a. For the sake of brevity, those descriptions will not be repeated here.

Figure 5:
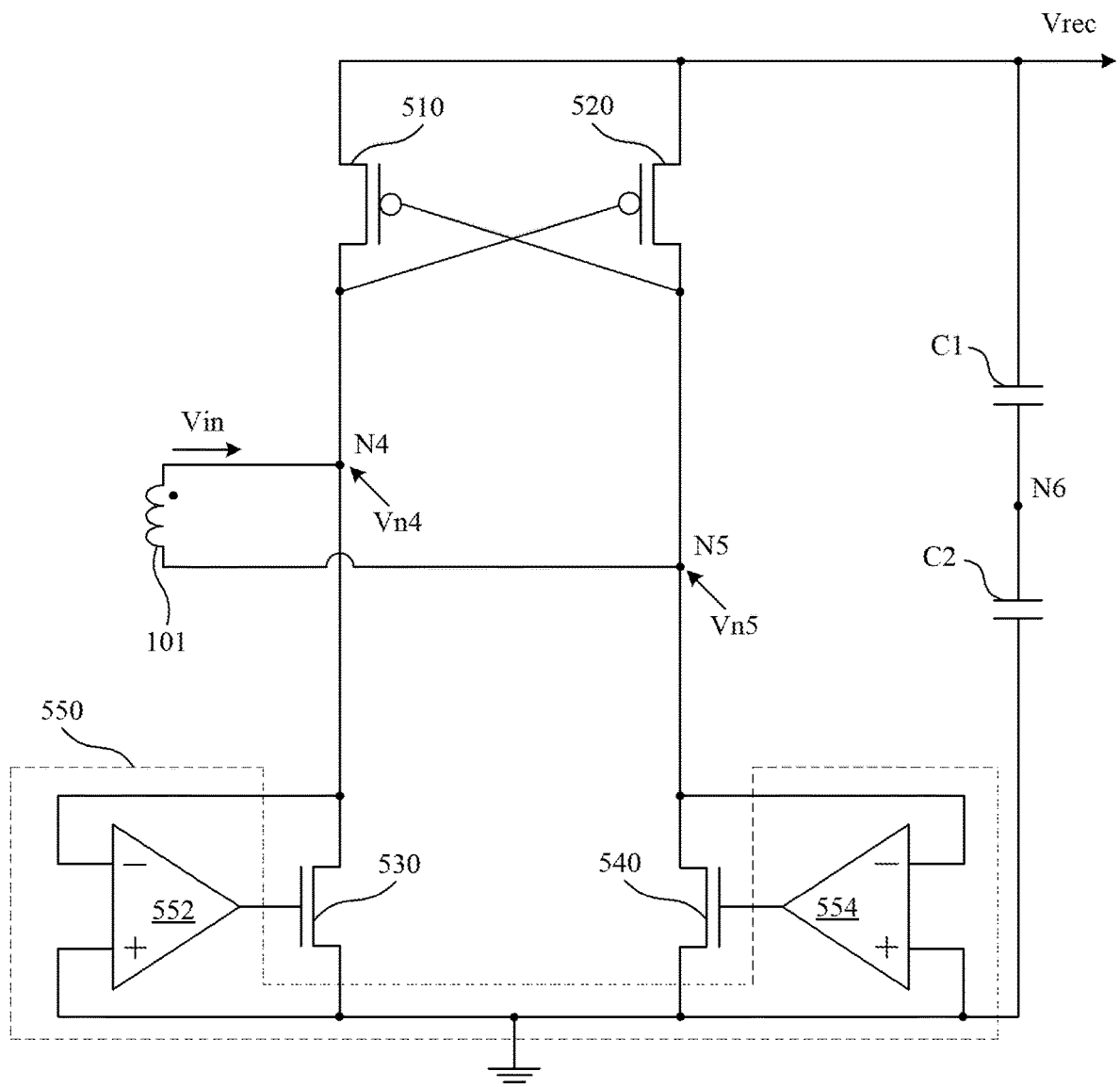
FIG. 5 is a simplified functional block diagram of the active rectifier according to one embodiment of the present disclosure.

FIG. 5 is a simplified functional block diagram of the active rectifier 110 according to one embodiment of the present disclosure. The active rectifier 110 comprises a fifth transistor 510, a sixth transistor 520, a seventh transistor 530, an eighth transistor 540, a control circuit 550, a first capacitor C1, and a second capacitor C2. The first node of the fifth transistor 510 is configured to provide the rectified voltage signal Vrec. The second node of the fifth transistor 510 is coupled with the first node of the secondary side coil 101 through the fourth node point N4, and is configured to receive the input voltage signal Vin. The first node of the sixth transistor 520 is configured to provide the rectified voltage signal Vrec, the second node of the sixth transistor 520 is coupled with the control node of the fifth transistor 510, and is coupled with the second node of the secondary side coil 101 through the fifth node point N5. The control node of the sixth transistor 520 is coupled with the second node of the fifth transistor 510. The first node of the seventh transistor 530 is coupled with the fourth node point N4, and the second node of the seventh transistor 530 is coupled with the ground terminal. The first node of the eighth transistor 540 is coupled with the fifth node point N5, and the second node of the eighth transistor 540 is coupled with the ground terminal. The first node of the first capacitor C1 is configured to receive the rectified voltage signal Vrec, and the second node of the first capacitor C1 is coupled with the sixth node point N6. The second capacitor C2 is coupled between the sixth node point N6 and the ground terminal.

The control circuit 550 comprises a first comparator 552 and a second comparator 554. The first input node of the first comparator 552 (e.g., the positive input node) is coupled with the ground terminal, the second input node of the first comparator 552 (e.g., the negative input node) is coupled with the fourth node point N4, and the output node of the first comparator 552 is coupled with the control node of the seventh transistor 530. The first input node of the second comparator 554 (e.g., the positive input node) is coupled with the ground terminal, the second input node of the second comparator 554 (e.g., the negative input node) is coupled with the fifth node point N5, and the output node of the second comparator 554 is coupled with the control node of the eighth transistor 540.

In practice, the fifth transistor 510 and the sixth transistor 520 may be realized by various suitable P-type transistors. The seventh transistor 530 and the eighth transistor 540 may be realized by various suitable N-type transistors.

When a corresponding current of the input voltage signal Vin flows from the first node of the secondary side coil 101 to the fourth node point N4, a fourth node voltage Vn4 of the fourth node point N4 would be higher than a fifth node voltage Vn5 of the fifth node point N5. Thus, the fifth transistor 510 may be conducted and the sixth transistor 520 may be switched off, and thereby making the input voltage signal Vin be transmitted to the aforesaid linear charger 120 through the fifth transistor 510, and also transmitted to the ground terminal through the first capacitor C1 and the second capacitor C2.

In this situation, the fourth node voltage Vn4 would be higher than the ground voltage of the ground terminal, and the fifth node point N5 would be lower than the ground voltage. Thus, the first comparator 552 may output a low voltage to switch off the seventh transistor 530, and the second comparator 554 may output a high voltage to conduct the eighth transistor 540.

On the contrary, when the corresponding current of the input voltage signal Vin flows from the second node of the secondary side coil 101 to the fifth node point N5, the fifth node point N5 may be higher than the fourth node voltage Vn4. In this situation, the fifth transistor 510 and the eighth transistor 540 may be switched off, and the sixth transistor 520 and the seventh transistor 530 may be conducted. Therefore, the input voltage signal Vin may be transmitted to the aforesaid linear charger 120 through the sixth transistor 520.

Figure 6:
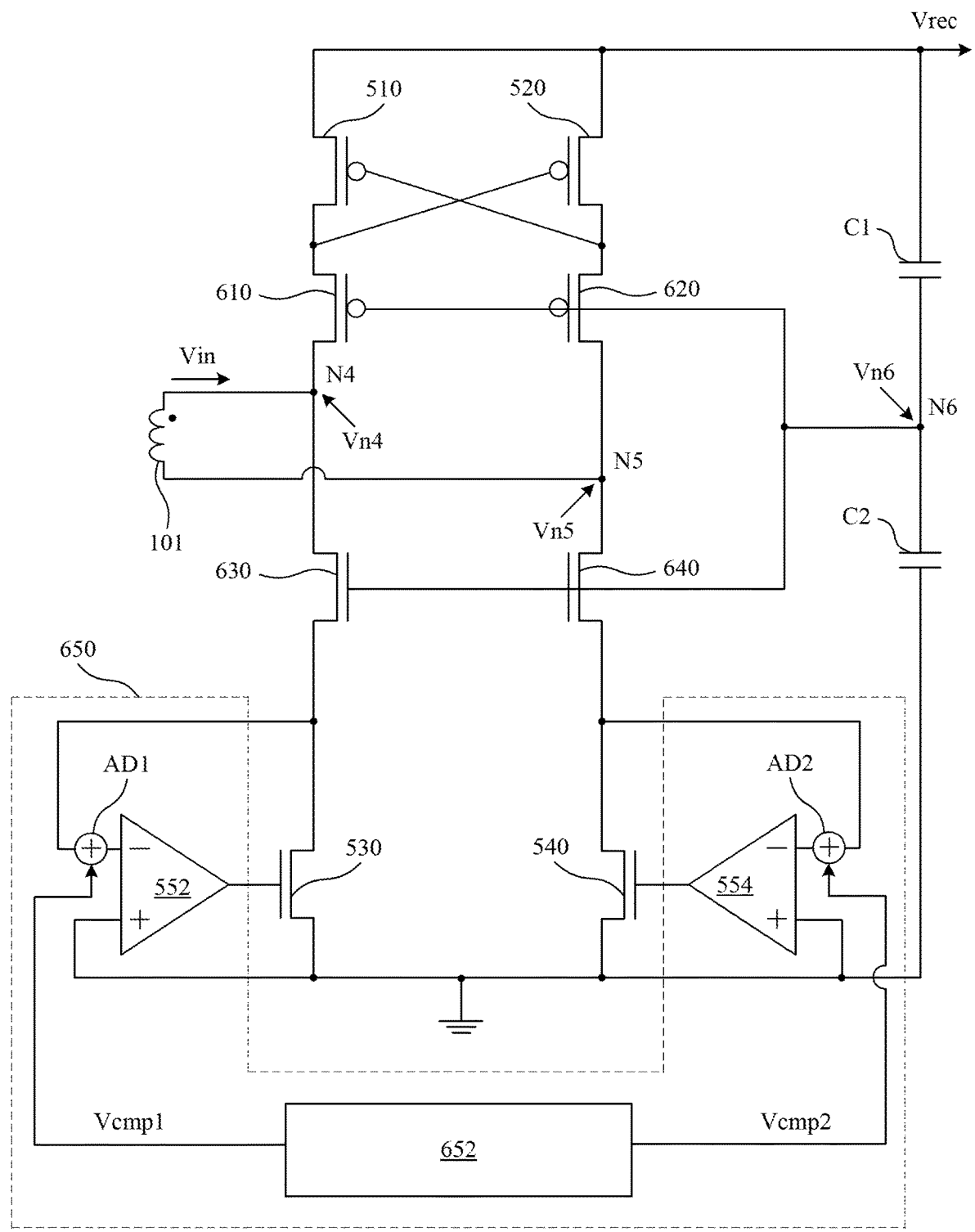
FIG. 6 is a simplified functional block diagram of an active rectifier according to one embodiment of the present disclosure.

FIG. 6 is a simplified functional block diagram of an active rectifier 110a according to one embodiment of the present disclosure. The active rectifier 110a is similar to the active rectifier 110, the difference is that the active rectifier 110a further comprises a ninth transistor 610, a tenth transistor 620, an eleventh transistor 630, a twelfth transistor 640, and a control circuit 650. The first node of the ninth transistor 610 is coupled with the second node of the fifth transistor 510, and the second node of the ninth transistor 610 is coupled with the fourth node point N4. The first node of the tenth transistor 620 is coupled with the second node of the sixth transistor 520, and the second node of the tenth transistor 620 is coupled with the fifth node point N5. The first node of the eleventh transistor 630 is coupled with the fourth node point N4, the second node of the eleventh transistor 630 is coupled with the first node of the seventh transistor 530. The first node of the twelfth transistor 640 is coupled with the fifth node point N5, and the second node of the twelfth transistor 640 is coupled with the first node of the eighth transistor 540. In addition, the control node of the ninth transistor 610, the control node of the tenth transistor 620, the control node of the eleventh transistor 630, and the control node of the twelfth transistor 640 are coupled with the sixth node point N6.

In practice, the ninth transistor 610 and the tenth transistor 620 may be realized by various suitable P-type transistors. The eleventh transistor 630 and the twelfth transistor 640 may be realized by various suitable N-type transistors.

In this embodiment, the capacitance of the first capacitor C1 is approximately equal to the capacitance of the second capacitor C2, and thereby making the magnitude of the sixth node point voltage Vn6 of the sixth node point N6 approximately equal to half of the magnitude of the rectified voltage signal Vrec. As a result, when the corresponding current of the input voltage signal Vin flows from the first node of secondary side coil 101 to the fourth node point N4, the fifth transistor 510, the eighth transistor 540, the ninth transistor 610, and the twelfth transistor 640 would be conducted, and the sixth transistor 520, the seventh transistor 530, the tenth transistor 620, and the eleventh transistor 630 would be switched off. When the corresponding current of the input voltage signal Vin flows from the second node of the secondary side coil 101 to the fifth node point N5, the fifth transistor 510, the eighth transistor 540, the ninth transistor 610, and the twelfth transistor 640 may be switched off, and the sixth transistor 520, the seventh transistor 530, the tenth transistor 620, and the eleventh transistor 630 would be conducted.

The voltage difference between the first node of the fifth transistor 510 and the fourth node point N4 would be allocated to the fifth transistor 510 and ninth transistor 610 coupled in a series connection. Therefore, the fifth transistor 510 and the ninth transistor 610 can be prevented from being damaged by the too large drain-to-source voltage. Similarly, the sixth transistor 520 and tenth transistor 620 coupled in the series connection, the seventh transistor 530 and eleventh transistor 630 coupled in the series connection, and the eighth transistor 540 and twelfth transistor 640 coupled in the series connection are capable of preventing the adjacent transistor from being damaged by the too large drain-to-source voltage.

In addition, since the seventh transistor 530 and eighth transistor 540 having larger width length ratios, the seventh transistor 530 and the eighth transistor 540 would have larger gate parasitic capacitors. Therefore, multiple buffer amplifiers (not shown in FIG. 6) may be coupled in the series connection between the seventh transistor 530 and first comparator 552, and between the eighth transistor 540 and the second comparator 554. However, the multiple buffer amplifiers coupled in the series connection may cause the seventh transistor 530 and the eighth transistor 540 facing the problem of conduction delay and switch off delay. As a result, the conversion efficiency of the active rectifier 110 may decrease, and the current may reversely flow from the fourth node point N4 or the fifth node point N5 to the ground terminal.

To overcome the aforesaid problems, the control circuit 650 not only comprises the first comparator 552 and the second comparator 554, but also comprises a first adder AD1, a second adder AD2, and a compensation circuit 652. The first adder AD1 is coupled with the second input node of the first comparator 552, and the second adder AD2 is coupled with the second input node of the second comparator 554. The compensation circuit 652 is coupled with the first adder AD1 and second adder AD2, and is configured to output a first compensation signal Vcmp1 and a second compensation signal Vcmp2 to the first adder AD1 and the second adder AD2, respectively.

Figure 7:
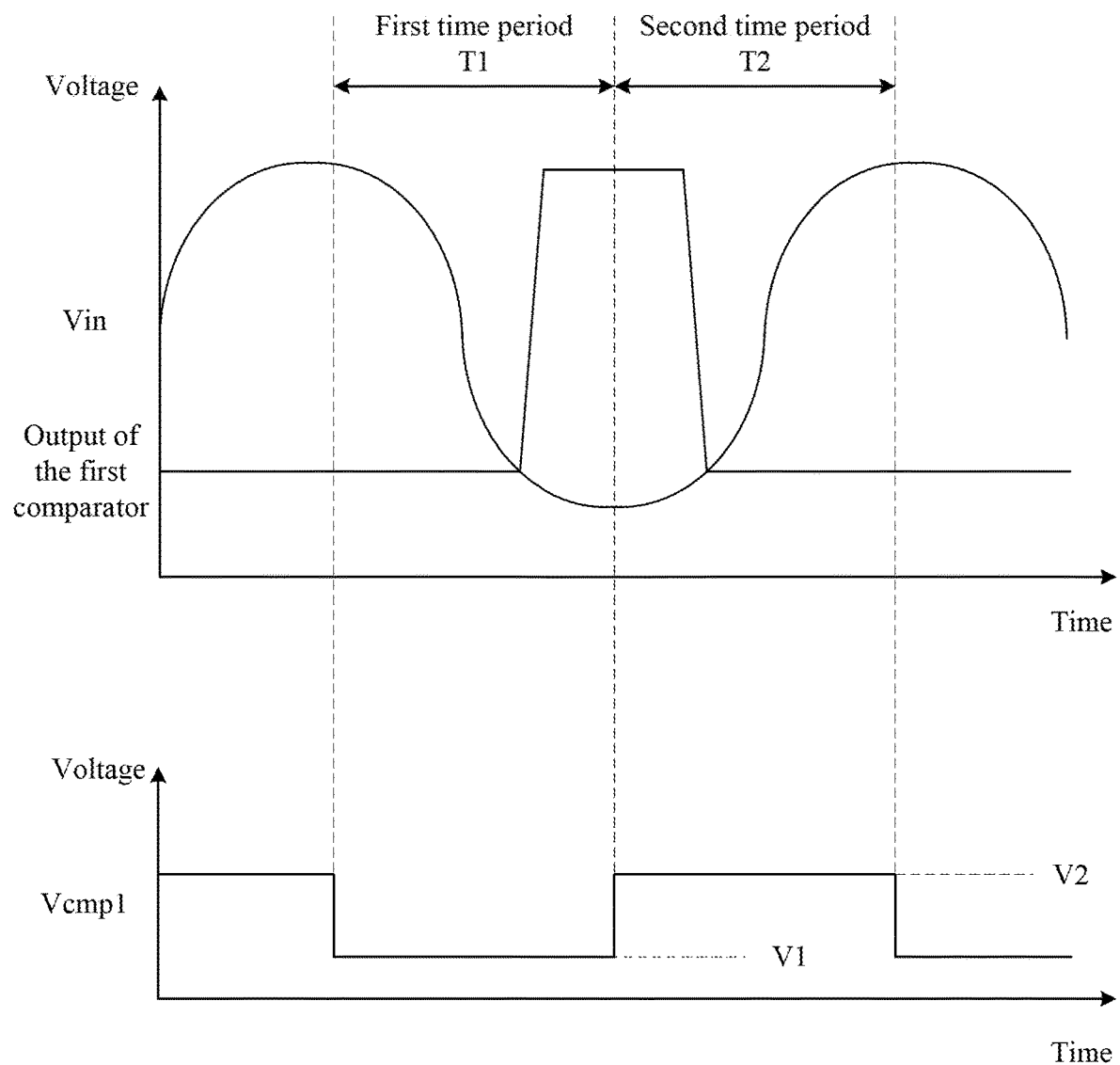
FIG. 7 illustrates schematic waveforms according to one operative embodiment of the active rectifier.

As shown in FIG. 7, with respect to the first comparator 552 and the first adder AD1, during a first time period T1, the seventh transistor 530 may be switched from the switch-off state to the conducted state. In this situation, the compensation circuit 652 may output the first compensation signal Vcmp1 having a first voltage level V1 to first adder AD1, so as to pull down the voltage level of the second input node of the first comparator 552. As a result, the time point that the first comparator 552 outputs the high voltage would be moved forward to conduct the seventh transistor 530 earlier.

In addition, during a second time period P2, the seventh transistor 530 may be switched from the conducted state to the switch-off state. In this situation, the compensation circuit 652 may output the first compensation signal Vcmp1 having a second voltage level V2 to the first adder AD1, so as to raise up the voltage level of the second input node of the first comparator 552. As a result, the time point that the first comparator 552 outputs the low voltage would be moved forward to switch off the seventh transistor 530 earlier, wherein the second voltage level V2 is higher than the first voltage level V1.

Similarly, when the eighth transistor 540 is switched from the switch-off state to the conducted state, the compensation circuit 652 may output the second compensation signal Vcmp2 having a third voltage level to the second adder AD2, so as to pull down the voltage level of the second input node of the second comparator 554. As a result, the time point that the second comparator 554 outputs the high voltage would be moved forward to conduct the eighth transistor 540 earlier. When the eighth transistor 540 is switched from the conducted state to the switch-off state, the compensation circuit 652 may output the second compensation signal Vcmp2 having a fourth voltage level to the second adder AD2, so as to raise up the voltage level of the second input node of the second comparator 554. As a result, the time point that the second comparator 554 outputs the low voltage would be moved forward to switch off the eighth transistor 540 earlier, wherein the fourth voltage level V4 is higher than the third voltage level.

The foregoing descriptions regarding the implementations, connections, operations, and related advantages of the active rectifier 110 are also applicable to the active rectifier 110a. For the sake of brevity, those descriptions will not be repeated here.

Figure 8:
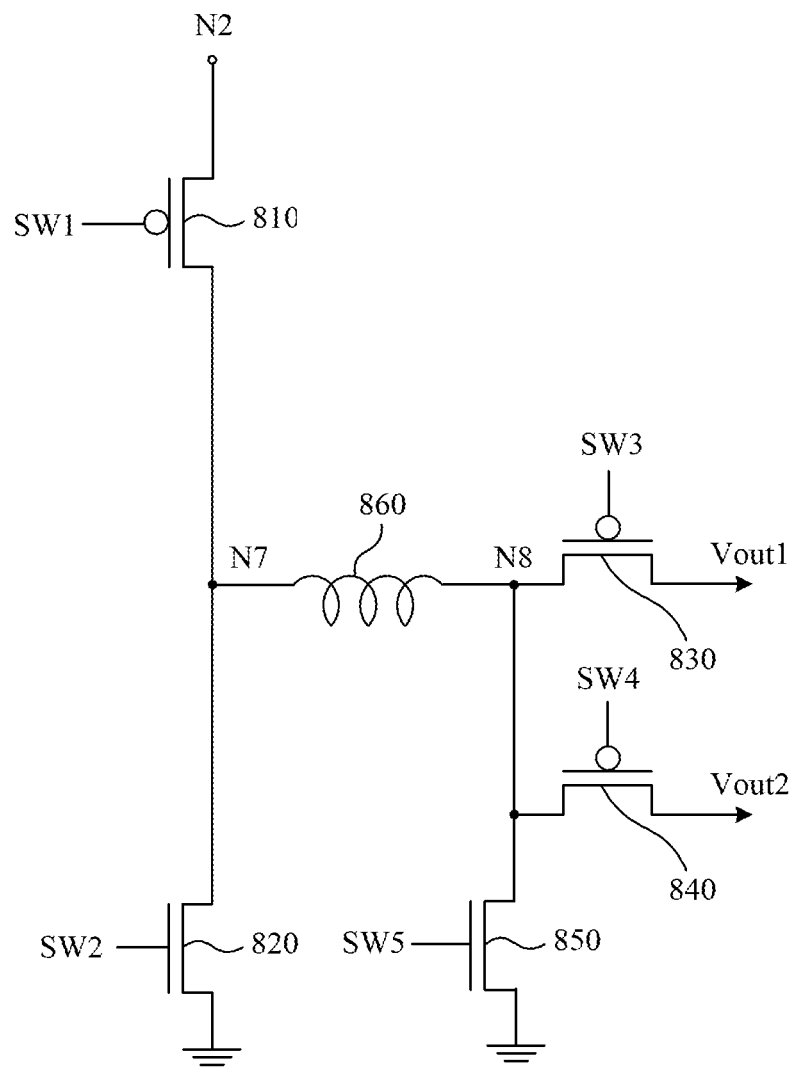
FIG. 8 is a simplified functional block diagram of the buck converter according to one embodiment of one present disclosure.

FIG. 8 is a simplified functional block diagram of the buck converter 130 according to one embodiment of one present disclosure. The buck converter 130 comprises a thirteenth transistor 810, a fourteenth transistor 820, a fifteenth transistor 830, a sixteenth transistor 840, a seventeenth transistor 850, and an inductor 860. The first node of the thirteenth transistor 810 is coupled with the first node point N1, the second node of the thirteenth transistor 810 is coupled with the seventh node point N7, and the control node of the thirteenth transistor 810 is configured to receive the first switch signal SW1. The first node of the fourteenth transistor 820 is coupled with the seventh node point N7, the second node of the fourteenth transistor 820 is coupled with the ground terminal, and the control node of the fourteenth transistor 820 is configured to receive the second switch signal SW2. The first node of the fifteenth transistor 830 is coupled with the eighth node point N8, the second node of the fifteenth transistor 830 is configured to provide the first output voltage signal Vout1, and the control node of the fifteenth transistor is configured to receive the third switch signal SW3. The first node of the sixteenth transistor 840 is coupled with the eighth node point N8, the second node of the sixteenth transistor 840 is configured to provide the second output voltage signal Vout2, and the control node of the sixteenth transistor 840 is configured to receive the fourth switch signal SW4. The first node of the seventeenth transistor 850 is coupled with the eighth node point N8, the second node of the seventeenth transistor 850 is coupled with the ground terminal, and the control node of the seventeenth transistor 850 is configured to receive the fifth switch signal SW5. The inductor 860 is coupled between the seventh node point N7 and the eighth node point N8.

In practice, the thirteenth transistor 810, the fifteenth transistor 830, and the sixteenth transistor 840 may be realized by various suitable P-type transistors. The fourteenth transistor 820 and the seventeenth transistor 850 may be realized by various suitable N-type transistors.

When the buck converter 130 outputs the first output voltage signal Vout1 and does not output the second output voltage signal Vout2, the thirteenth transistor 810 and the fourteenth transistor 820 would be alternatively conducted and switched off, the fifteenth transistor 830 and the seventeenth transistor 850 would also be alternatively conducted and switched off. In addition, the sixteenth transistor 840 is maintained at the switch-off state.

On the other hand, when the buck converter 130 does not output the first output voltage signal Vout1 and outputs the second output voltage signal Vout2, the thirteenth transistor 810 and the fourteenth transistor 820 would be alternatively conducted and switched off, the sixteenth transistor 840 and the seventeenth transistor 850 would also be alternatively conducted and switched off. In addition, the fifteenth transistor 830 is maintained at the switch-off state.

In practice, the third switch signal SW3 and the fourth switch signal SW4 may be two pulse width modulation (PWM) signals that have different duty ratios, so as to configure the first output voltage signal Vout1 and the second output voltage signal Vout2 to have different voltage levels.

Figure 9:
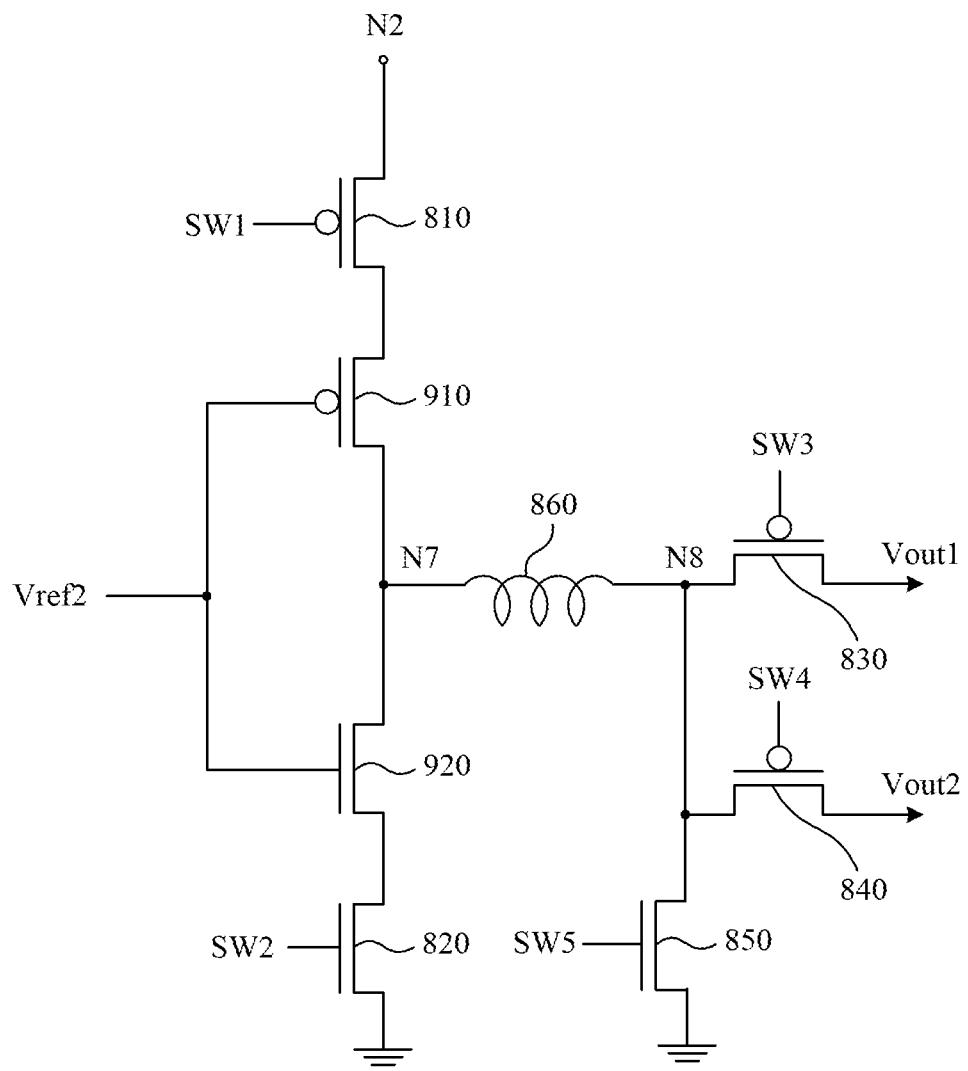
FIG. 9 is a simplified functional block diagram of a buck converter according to one embodiment of the present disclosure.

FIG. 9 is a simplified functional block diagram of a buck converter 130*a* according to one embodiment of the present disclosure. The buck converter 130*a* is suitable for the wireless power system 100 and similar to the buck converter 130, the difference is that the buck converter 130*a* further comprises an eighteenth transistor 910 and a nineteenth transistor 920. The first node of the eighteenth transistor 910 is coupled with the second node of the thirteenth transistor 810, and the second node of the eighteenth transistor 910 is coupled with the seventh node point N7. The first node of the nineteenth transistor 920 is coupled with the seventh node point N7, and the second node of the nineteenth transistor 920 is coupled with the first node of the fourteenth transistor 820.

In practice, the eighteenth transistor 910 can be realized by various suitable P-type transistors. The nineteenth transistor 920 can be realized by various suitable N-type transistors.

The control node of the eighteenth transistor 910 and the control node of the nineteenth transistor 920 are configured to receive the second reference voltage Vref2, wherein the magnitude of the second reference voltage Vref2 is approximately equal to half of the magnitude of the first node point voltage Vn1. Therefore, while the thirteenth transistor 810 is conducted, the eighteenth transistor 910 is also conducted, and while the fourteenth transistor 820 is conducted, the nineteenth transistor 920 is also conducted.

As a result, the voltage difference between the first node of the thirteenth transistor 810 and the seventh node point N7 would be allocated to the thirteenth transistor 810 and the eighteenth transistor 910. Therefore, the thirteenth transistor 810 and the eighteenth transistor 910 can be prevented from being damaged by the too large drain-to-source voltage. Similarly, the voltage difference between the seventh node point N7 and the ground terminal would be allocated to the fourteenth transistor 820 and the nineteenth transistor 920. Therefore, the fourteenth transistor 820 and the nineteenth transistor 920 can be prevented from being damaged by the too large drain-to-source voltage.

As can be appreciated from the foregoing descriptions, the components of the wireless power system 100 are all compatible with the semiconductor fabrication process, and thus the wireless power system 100 may be realized by a single system-on-chip (SoC) circuit. As a result, the wireless power system 100 can provide high charging and discharging efficiency.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "voltage signal" used throughout the description and the claims may be expressed in the format of a current in implementations, and the term "current signal" used throughout the description and the claims may be expressed in the format of a voltage in implementations.

In addition, the singular forms "a," "an," and "the" herein are intended to comprise the plural forms as well, unless the context clearly indicates otherwise.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wireless power system, configured to receive an input voltage signal from a first node of a secondary side coil, and charge a battery module according to the input voltage signal, comprising:
   an active rectifier, configured to receive the input voltage signal, and rectify the input voltage signal to generate a rectified voltage signal;
   a linear charger, comprising:
      a first resistor, coupled between a first node point and a second node point, wherein the battery module coupled with the first node point;
      a second resistor, coupled between the second node point and a ground terminal;
      a third resistor, coupled between a third node point and the ground terminal;
      a mode switching circuit, configured to generate a mode switching signal according to a second node point voltage of the second node point and a third node point voltage of the third node point; and
      a current mirror circuit, configured to output a reference current and a charge current to the third node point and the first node point, respectively, according to the rectified voltage signal and the mode switching signal; and
   a buck converter, coupled with the first node point, and configured to selectively output a first output voltage signal or a second output voltage signal according to a first node point voltage of the first node point,
   wherein the mode switching circuit comprises:
   a first operational amplifier, comprising a first input node, a second input node, and an output node, wherein the first input node of the first operational amplifier is coupled with the third node point, and the second input node of the first operational amplifier is configured to receive a first reference voltage;
   a second operational amplifier, comprising a first input node, a second input node, and an output node, wherein the first input node of the second operational amplifier is coupled with the second node point, and the second input node of the second operational amplifier is configured to receive the first reference voltage;
   a third transistor, comprising a first node, a second node, and a control node, wherein the first node of the third transistor is coupled with the output node of the first operational amplifier, and the control node of the third transistor is coupled with the output node of the second operational amplifier; and
   a fourth transistor, comprising a first node, a second node, and a control node, wherein the first node of the fourth transistor is coupled with the second node of the third transistor, the second node of the fourth transistor is coupled with the output node of the second operational amplifier, and the control node of the fourth transistor is coupled with the output node of the first operational amplifier.

2. The wireless power system of claim 1, wherein when the second node point voltage is smaller than a predetermined voltage, the charge current has a fixed ratio with the reference current, and when the second node point voltage is larger than or equal to the predetermined voltage, the charge current is negatively correlated with the first node point voltage or the second node point voltage.

3. The wireless power system of claim 1, wherein the current mirror circuit comprises:
   a first transistor, comprising a first node, a second node, and a control node, wherein the first node of the first transistor is configured to receive the rectified voltage signal, and the second node of the first transistor couples with the third node point; and
   a second transistor, comprising a first node, a second node, and a control node, wherein the first node of the second transistor is configured to receive the rectified voltage signal, and the second node of the second transistor couples with the first node point;
   wherein the control node of the first transistor and the control node of the second transistor are configured to receive the mode switching signal.

4. The wireless power system of claim 3, wherein the current mirror circuit further comprises:
   a regulating transistor, comprising a first node, a second node, and a control node, wherein the first node of the regulating transistor is coupled with the second node of the first transistor, and the second node of the regulating transistor is coupled with the third node point; and
   a regulating operational amplifier, comprising a first input node, a second input node, and an output node, wherein the first input node of the regulating operational amplifier is coupled with the first node of the regulating transistor, the second input node of the regulating operational amplifier is coupled with the first node point, and the output node of the regulating operational amplifier is coupled with the control node of the regulating transistor.

5. The wireless power system of claim 1, wherein the active rectifier comprises:
   a fifth transistor, comprising a first node, a second node, and a control node, wherein the first node of the fifth transistor is configured to provide the rectified voltage signal, the second node of the fifth transistor is coupled with the first node of the secondary side coil through a fourth node point and configured to receive the input voltage signal;
   a sixth transistor, comprising a first node, a second node, and a control node, wherein the first node of the sixth transistor is configured to provide the rectified voltage signal, the control node of the sixth transistor is coupled with the second node of the fifth transistor, the second node of the sixth transistor is coupled with the control node of the fifth transistor, and coupled with a second node of the secondary side coil through a fifth node point;
   a seventh transistor, comprising a first node, a second node, and a control node, wherein the first node of the seventh transistor is coupled with the fourth node point, and the second node of the seventh transistor is coupled with the ground terminal;
   an eighth transistor, comprising a first node, a second node, and a control node, wherein the first node of the eighth transistor is coupled with the fifth node point, and the second node of the eighth transistor is coupled with the ground terminal;
   a first capacitor, comprising a first node, and a second node, wherein the first node of the first capacitor is configured to receive the rectified voltage signal, and the second node of the first capacitor is coupled with a sixth node point;
   a second capacitor, coupled between the sixth node point and the ground terminal; and a control circuit, coupled with the control node of the seventh transistor and the control node of the eighth transistor, configured to receive a fourth node point voltage from the fourth node point, and receive a fifth node point voltage from the fifth node point, wherein the control circuit is configured to control the seventh transistor and the eighth transistor according to the fourth node point voltage and the fifth node point voltage.

6. The wireless power system of claim 5, wherein when the fourth node point voltage is lower than a ground voltage, the control circuit switches the seventh transistor from a switch-off state to a conducted state, and when the fifth node point voltage is lower than the ground voltage, the control circuit switches the eighth transistor from the switch-off state to the conducted state.

7. The wireless power system of claim 5, wherein the control circuit comprises:
   a first comparator, comprising a first input node, a second input node, and an output node, wherein the first input node of the first comparator is coupled with the ground terminal, the second input node of the first comparator is coupled with the fourth node point, and the output node of the first comparator is coupled with the control node of the seventh transistor; and
   a second comparator, comprising a first input node, a second input node, and an output node, wherein the first input node of the second comparator is coupled with the ground terminal, the second input node of the second comparator is coupled with the fifth node point, and the output node of the second comparator is coupled with the control node of the eighth transistor.

8. The wireless power system of claim 7, wherein the control circuit further comprises:
   a first adder, coupled with the second input node of the first comparator;
   a second adder, coupled with the second input node of the second comparator; and
   a compensation circuit, configured to output a first compensation signal and a second compensation signal to the first adder and the second adder, respectively;
   wherein when the seventh transistor is switched from a switch-off state to a conducted state, the first compensation signal has a first voltage level, and when the seventh transistor is switched from the conducted state to the switch-off state, the first compensation signal has a second voltage level;
   wherein when the eighth transistor is switched from the switch-off state to the conducted state, the second compensation signal has a third voltage level, and when the eighth transistor is switched from the conducted state to the switch-off state, the second compensation signal has a fourth voltage level;
   wherein the second voltage level is higher than the first voltage level, and the fourth voltage level is higher than the third voltage level.

9. The wireless power system of claim 5, wherein the active rectifier further comprises:
   a ninth transistor, comprising a first node, a second node, and a control node, wherein the first node of the ninth transistor is coupled with the second node of the fifth transistor, and the second node of the ninth transistor is coupled with the fourth node point;
   a tenth transistor, comprising a first node, a second node, and a control node, wherein the first node of the tenth transistor is coupled with the second node of the sixth transistor, and the second node of the tenth transistor is coupled with the fifth node point;
   an eleventh transistor, comprising a first node, a second node, and a control node, wherein the first node of the eleventh transistor is coupled with the fourth node point, and the second node of the eleventh transistor is coupled with the first node of the seventh transistor; and
   a twelfth transistor, comprising a first node, a second node, and a control node, wherein the first node of the twelfth transistor is coupled with the fifth node point, the second node of the twelfth transistor is coupled with the first node of the eighth transistor, and the control node of the ninth transistor, the control node of the tenth transistor, the control node of the eleventh transistor, and the control node of the twelfth transistor are coupled with the sixth node point.

10. The wireless power system of claim 1, wherein the buck converter comprises:
   a thirteenth transistor, comprising a first node, a second node, and a control node, wherein the first node of the thirteenth transistor is coupled with the first node point, the second node of the thirteenth transistor is coupled with a seventh node point, and the control node of the thirteenth transistor is configured to receive a first switch signal;
   a fourteenth transistor, comprising a first node, a second node, and a control node, wherein the first node of the fourteenth transistor is coupled with the seventh node point, the second node of the fourteenth transistor is coupled with the ground terminal, and the control node of the fourteenth transistor is configured to receive a second switch signal;
   an inductor, coupled between the seventh node point and an eighth node point;
   a fifteenth transistor, comprising a first node, a second node, and a control node, wherein the first node of the fifteenth transistor is coupled with the eighth node point, the second node of the fifteenth transistor is configured to provide the first output voltage signal, and the control node of the fifteenth transistor is configured to receive a third switch signal;
   a sixteenth transistor, comprising a first node, a second node, and a control node, wherein the first node of the sixteenth transistor is coupled with the eighth node point, the second node of the sixteenth transistor is configured to provide the second output voltage signal, and the control node of the sixteenth transistor is configured to receive a fourth switch signal; and
   a seventeenth transistor, comprising a first node, a second node, and a control node, wherein the first node of the seventeenth transistor is coupled with the eighth node point, the second node of the seventeenth transistor is coupled with the ground terminal, and the control node of the seventeenth transistor is configured to receive a fifth switch signal.

11. The wireless power system of claim 10, wherein the buck converter further comprises:
   an eighteenth transistor, comprising a first node, a second node, and a control node, wherein the first node of the eighteenth transistor is coupled with the second node of the thirteenth transistor, and the second node of the eighteenth transistor is coupled with the seventh node point; and
   a nineteenth transistor, comprises a first node, a second node, and a control node, wherein the first node of the nineteenth transistor is coupled with the seventh node point, and the second node of the nineteenth transistor is coupled with the first node of the fourteenth transistor;

wherein the control node of the eighteenth transistor and the control node of the nineteenth transistor are configured to receive a second reference voltage, and magnitude of the second reference voltage is half of magnitude of the first node point voltage.

* * * * *